United States Patent
Farland et al.

(10) Patent No.: US 9,752,712 B2
(45) Date of Patent: Sep. 5, 2017

(54) CONDUIT-COUPLING ADAPTOR FOR COUPLING FLUID CONDUITS OF DISPARATE DIAMETERS

(71) Applicant: Hyde Tools, Inc., Southbridge, MA (US)

(72) Inventors: Richard M. Farland, Fiskdale, MA (US); Corey Talbot, Hebron, CT (US)

(73) Assignee: HYDE TOOLS, INC., Southbridge, MA (US)

( * ) Notice: Subject to any disclaimer, the term of this patent is extended or adjusted under 35 U.S.C. 154(b) by 0 days.

(21) Appl. No.: 14/594,359

(22) Filed: Jan. 12, 2015

(65) Prior Publication Data

US 2015/0198274 A1 Jul. 16, 2015

Related U.S. Application Data

(60) Provisional application No. 61/926,439, filed on Jan. 13, 2014.

(51) Int. Cl.
| | |
|---|---|
| *A47L 9/24* | (2006.01) |
| *F16L 25/14* | (2006.01) |
| *F16L 21/00* | (2006.01) |
| *F16L 47/26* | (2006.01) |

(52) U.S. Cl.
CPC .............. *F16L 25/14* (2013.01); *F16L 21/002* (2013.01); *F16L 47/265* (2013.01)

(58) Field of Classification Search
CPC ....... F16L 25/14; F16L 21/002; F16L 47/265; F16L 37/025; A47L 9/24; A47L 9/242
USPC ............................................................. 285/7
See application file for complete search history.

(56) References Cited

U.S. PATENT DOCUMENTS

| | | | | | |
|---|---|---|---|---|---|
| 3,602,531 | A | * | 8/1971 | Patry | F16L 21/002 285/148.23 |
| 3,680,896 | A | * | 8/1972 | Cupit | E03D 11/17 285/148.23 |
| 3,807,744 | A | * | 4/1974 | Gibling | B29C 41/14 138/96 R |

(Continued)

FOREIGN PATENT DOCUMENTS

GB 1028624 A * 5/1966 ............ F16L 37/025

*Primary Examiner* — Adriana Figueroa
(74) *Attorney, Agent, or Firm* — Louis J. Franco; Law Office of Louis J. Franco (57) ABSTRACT

A conduit-coupling adaptor configured for mutually joining conduits of disparate diameters includes a central conduit with interior and exterior surfaces extending longitudinally between central-conduit first and second ends. The central-conduit first and second ends define, respectively, first-end and second-end coupling sleeves that extend longitudinally in opposite directions and terminate at, respectively, first and second openings. The coupling sleeves can be implemented, alternatively, as male or female coupling members relative to other conduits. A first-end skirt includes a skirt wall concentrically disposed about at least a lengthwise portion of the central-conduit first end. The skirt wall has skirt-wall inside and outside surfaces that longitudinally co-extend with at least a portion of the first-end coupling sleeve and are joined to the central-conduit wall by a shoulder. The skirt-wall inside surface defines a socket that is configured as a female connector for insertably receiving a male coupling member of another conduit.

12 Claims, 5 Drawing Sheets

(56) References Cited

U.S. PATENT DOCUMENTS

| | | | | |
|---|---|---|---|---|
| 4,116,477 A | * | 9/1978 | Wahoski | F16L 19/00 285/148.23 |
| 4,318,547 A | * | 3/1982 | Ericson | F16L 25/14 277/607 |
| 4,580,816 A | * | 4/1986 | Campbell | A61M 39/00 285/321 |
| 4,625,998 A | * | 12/1986 | Draudt | A47L 9/242 285/110 |
| 4,941,689 A | | 7/1990 | Sjoberg | |
| 4,964,189 A | * | 10/1990 | Rau | A47L 9/242 15/327.2 |
| 5,881,899 A | * | 3/1999 | Suzuki | F16L 21/002 215/232 |
| 6,394,505 B1 | * | 5/2002 | Schmucki | F16L 25/14 277/607 |
| 7,032,933 B2 | * | 4/2006 | Hellman | F16L 25/14 285/105 |
| 8,113,543 B1 | * | 2/2012 | Romani | A01K 13/001 15/419 |
| 8,444,188 B2 | * | 5/2013 | Pucciani | F16L 21/002 285/148.18 |
| 2003/0184085 A1 | * | 10/2003 | Thompson | F16L 21/002 285/92 |
| 2005/0082828 A1 | | 4/2005 | Wicks et al. | |
| 2009/0250922 A1 | * | 10/2009 | Rossman | F16L 25/14 285/24 |
| 2011/0101677 A1 | * | 5/2011 | Heindl | F16L 25/14 285/148.23 |
| 2012/0175868 A1 | | 7/2012 | Welchert | |

* cited by examiner

CONDUIT-COUPLING ADAPTOR FOR COUPLING FLUID CONDUITS OF DISPARATE DIAMETERS

PROVISIONAL PRIORITY CLAIM

Priority based on Provisional Application, Ser. No. 61/926,439 filed Jan. 13, 2014, and entitled "CONDUIT-COUPLING ADAPTOR FOR COUPLING FLUID CONDUITS OF DISPARATE DIAMETERS" is claimed. Moreover, the entirety of the previous provisional application, including the drawings, is incorporated herein by reference as if set forth fully in the present application.

BACKGROUND

Hoses for central and portable vacuum cleaning systems (e.g. shop or garage vacuums) are available in several different standard diameters. When coupling two hoses of disparate diameters, a coupling adaptor is required. Presently available coupling adaptors include, for example, a first end configured to receive, or be received by, a first hose of a first diameter and a second end, opposite the first end, configured to receive, or be received by, a second hose of a second diameter different from the first diameter. Since each coupling adaptor is configured to cooperatively couple only two hoses of specific diameters, a garage or shop, for example, having vacuum hoses of several different sizes requires an array of hose adaptors to facilitate the selective coupling of different hose-size combinations.

Accordingly, a need exists for a single conduit-coupling adaptor that facilitates the coupling of conduits (e.g., vacuum hoses) of various diameters in order to reduce the number of coupling adapters required to couple various combinations of conduits.

SUMMARY

In each of various alternative embodiments, a conduit-coupling adaptor is configured for mutually coupling fluid (e.g., "air" in a vacuum system) conduits of various disparate diameters. The adaptor overall has a predefined default configuration and is sufficiently rigid to be self-supporting. However, in various versions, the adaptor can be flexed to deviate from its predefined configuration when subjected to an applied distorting force, and exhibits a restorative "memory" property such that, when the applied distorting force is removed, the adaptor returns to its predefined (default) configuration. Accordingly, the adaptor can be fabricated from any one or more of numerous materials such as, by way of non-limiting example, rubber and/or a polymeric material such as plastic. The ability of the adaptor to flex or "distort" increases its durability and facilitates both fluid-tight coupling and frictional engagement with other conduits.

At its center, the conduit-coupling adaptor includes a central conduit having a central-conduit wall with interior and exterior surfaces. The interior and exterior surfaces extend longitudinally along a central-conduit axis between central-conduit first and second ends, which ends are integrally joined to one another through a conduit center portion situated between the first and second ends.

The central-conduit first end defines a first-end coupling sleeve that extends longitudinally away from the conduit center portion toward a first opening defined by the central-conduit first end. The first-end coupling sleeve has first-sleeve inner and outer surfaces defined by, respectively, co-extensive portions of the interior and exterior surfaces of the central-conduit wall. Correspondingly, the central-conduit second end defines a second-end coupling sleeve that extends longitudinally away from the conduit center portion, in a direction opposite the extension of the first-end coupling sleeve, toward a second opening defined by the central-conduit second end. The second-end coupling sleeve has second-sleeve inner and outer surfaces defined by, respectively, co-extensive portions of the interior and exterior surfaces of the central-conduit wall.

Concentrically disposed about at least a lengthwise portion of the central-conduit first end is a self-supporting first-end skirt defined by a skirt wall. The skirt wall has skirt-wall inside and outside surfaces that longitudinally co-extend with at least a portion of the first-end coupling sleeve. Additionally, the skirt is joined to the central conduit by a shoulder that transitions the skirt-wall inside and outside surfaces to the exterior surface of the central-conduit wall.

The first-end coupling sleeve has first-sleeve inner and outer diameters, while the second-end coupling sleeve has second-sleeve inner and outer diameters. In alternative configurations, at least one of (i) the first-sleeve inner diameter, (ii) the first-sleeve outer diameter, (iii) the second-sleeve inner diameter and (iv) the second-sleeve outer diameter varies as a function of axial displacement along the central-conduit axis. Diameters that vary as a function of axial displacement alternatively facilitate a coupling sleeve's implementation as a male or female coupling member, an aspect that it more thoroughly described in the detailed description in conjunction with the drawings. Additionally, the skirt-wall inside surface defines a skirt-wall inside diameter larger than the first-sleeve outer diameter such that there exists an annular gap between the first sleeve and the skirt, and the skirt defines a socket that is configured as a female connector (or "coupling member") for insertably receiving a male coupling member of another conduit.

Representative embodiments are more completely described and depicted in the following detailed description and the accompanying drawings.

DETAILED DESCRIPTION

The following description of variously configured conduit-coupling adapters is demonstrative in nature and is not intended to limit the invention or its application of uses. Accordingly, the various implementations, aspects, versions and embodiments described in the summary and detailed description are in the nature of non-limiting examples falling within the scope of the appended claims and do not serve to define the maximum scope of the claims.

Figure 1:
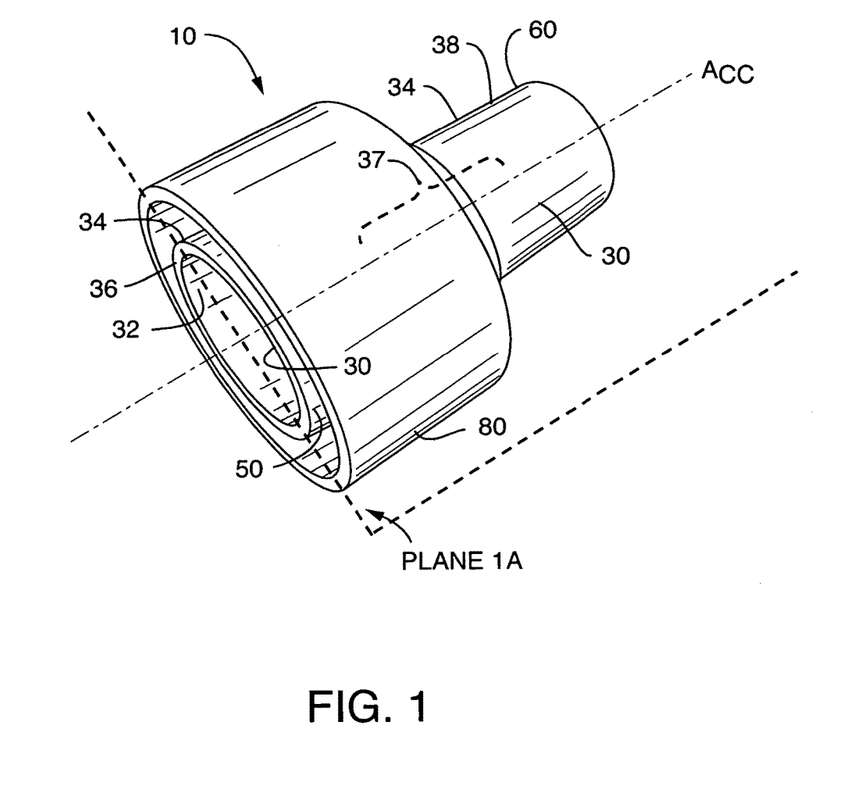
FIG. 1 is a side perspective view of a conduit-coupling adaptor configured for mutually coupling fluid conduits of disparate diameters.
Figure 1A:
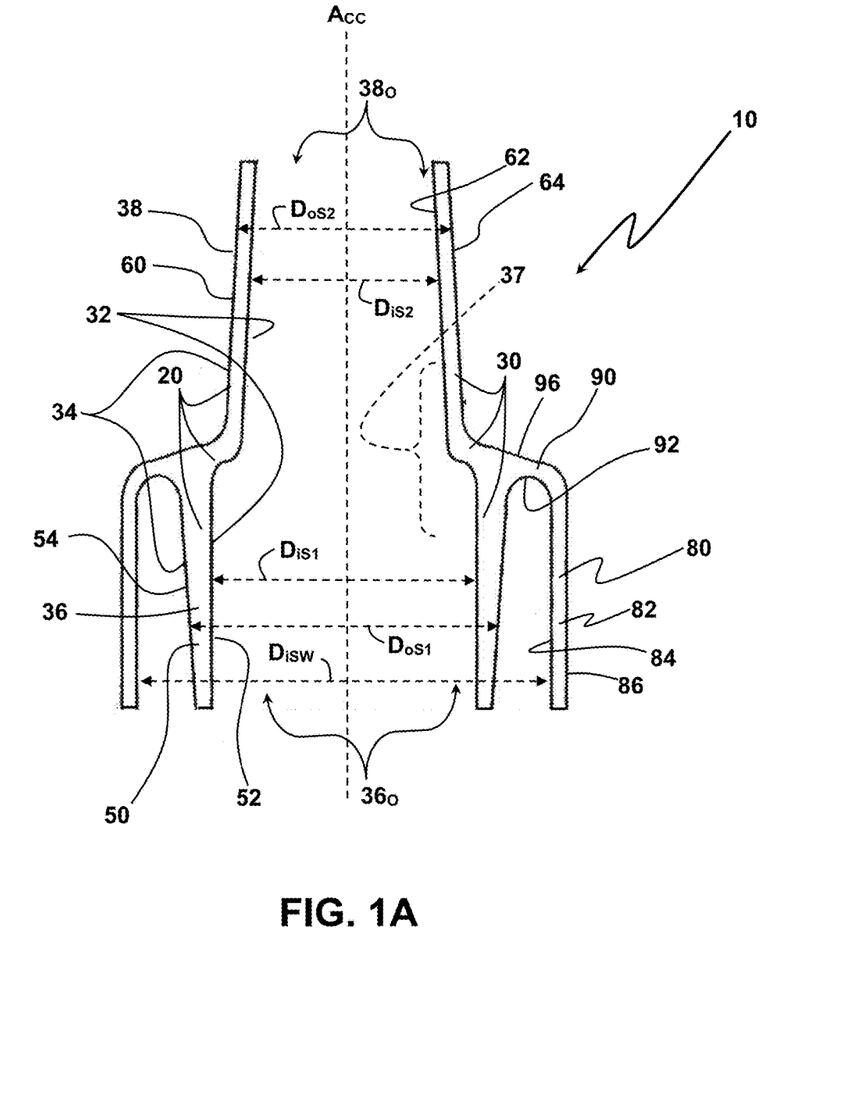
FIG. 1A is a cross-sectional view into the plane IA of FIG. 1.

Referring initially to FIG. 1 and FIG. 1A, the latter being a cross-sectional view into the plane IA of FIG. 1, an illustrative conduit-coupling adapter 10 is configured for mutually coupling, in series, fluid conduits of disparate inner and/or outer diameters. In various embodiments, an adapter 10 is configured for coupling vacuum hoses such as those used in conjunction with household vacuum cleaners, garage and shop vacuums, and dust-creating power tools such as saws, sanders and routers, by way of non-limiting example. Moreover, the conduits can be flexible, rigid or partially flexible and partially rigid.

The example of FIGS. 1 and 1A includes a self-supporting, tubular central conduit 20 having a central-conduit wall 30 with interior and exterior surfaces 32 and 34. The interior and exterior surfaces 32 and 34 extend longitudinally along a central-conduit axis $A_{cc}$ between, and co-extensively with, central-conduit first and second ends 36 and 38. The first and second ends 36 and 38 are integrally joined to one another through a conduit center portion 37 situated between the first and second ends 36 and 38.

The central-conduit first end 36 defines a first-end coupling sleeve 50, which may be alternatively and interchangeably referred to as "first coupling sleeve 50" or "first sleeve 50." The first sleeve 50 extends longitudinally away from the center portion 37 toward a first opening 36o defined by the central-conduit first end 36. The first sleeve 50 has first-sleeve inner and outer surfaces 52 and 54 defined by, respectively, co-extensive portions of the interior and exterior surfaces 32 and 34 of the central-conduit wall 30.

With continued reference to FIGS. 1 and 1A, the central-conduit second end 38 defines a second-end coupling sleeve 60, which may be alternatively and interchangeably referred to as "second coupling sleeve 60" or "second sleeve 60." The second sleeve 60 extends longitudinally away from the center portion 37, in a direction opposite the extension of the first sleeve 50, toward a second opening 38o defined by the central-conduit second end 38. The second sleeve 60 has second-sleeve inner and outer surfaces 62 and 64 defined by, respectively, co-extensive portions of the interior and exterior surfaces 32 and 34 of the central-conduit wall 30.

Disposed concentrically (i.e., co-axially about the central-conduit axis $A_{cc}$) about at least a lengthwise portion of the central-conduit first end 36 is a self-supporting first-end skirt 80. The skirt 80 is defined by a skirt wall 82 having skirt-wall inside and outside surfaces 84 and 86 that longitudinally co-extend with at least a portion of the first sleeve 50. The skirt 80 is structurally joined to the central conduit 20 by a shoulder 90 through which, as shown most clearly in FIG. 1A, the skirt-wall inside and outside surfaces 84 and 86 are transitioned to the exterior surface 34 of the central-conduit wall 30. More specifically, in an embodiment that is integrally molded as a single piece, such as the illustrative example of FIGS. 1 through 4, a shoulder inside surface 92 transitionally joins the skirt-wall inside surface 84 to that portion of the central-conduit wall 30 that ultimately defines the first-sleeve outer surface 54, while the skirt-wall outside surface 86 transitions to the portion of central-conduit wall 30 defining the second-sleeve outer surface 64 through a shoulder outer surface 96.

Referring still to FIG. 1A, the first sleeve 50 has first-sleeve inner and outer diameters $D_{iS1}$ and $D_{oS1}$. In alternative embodiments, either or both of these diameters $D_{iS1}$ and $D_{oS1}$ can vary as a function of axial displacement along the central-conduit axis $A_{cc}$. Whether and how either diameter $D_{iS1}$ and $D_{oS1}$ varies can define whether the first sleeve 50 serves as a male or female connector, or both. In the particular example of FIG. 1A, the first-sleeve inner diameter $D_{iS1}$ remains constant as a function of displacement along the central-conduit axis $A_{cc}$; hence, in this cross-sectional view, the opposite sides of the first-sleeve inner surface 52 depicted are mutually parallel. However, the first-sleeve outer diameter $D_{oS1}$ reduces as a function of displacement along the central-conduit axis $A_{cc}$ in a direction away from the conduit center portion 37. That is, the first-sleeve outer surface 54 tapers toward a focal point (not shown) that would be distally located beyond the bottom edge of the drawing sheet. The tapering of the first-sleeve outer surface 54 in this manner facilitates the use of the first sleeve 50 as a male connector, a coupling combination not shown in any of the drawings, but which can nevertheless be appreciated.

Figure 2:
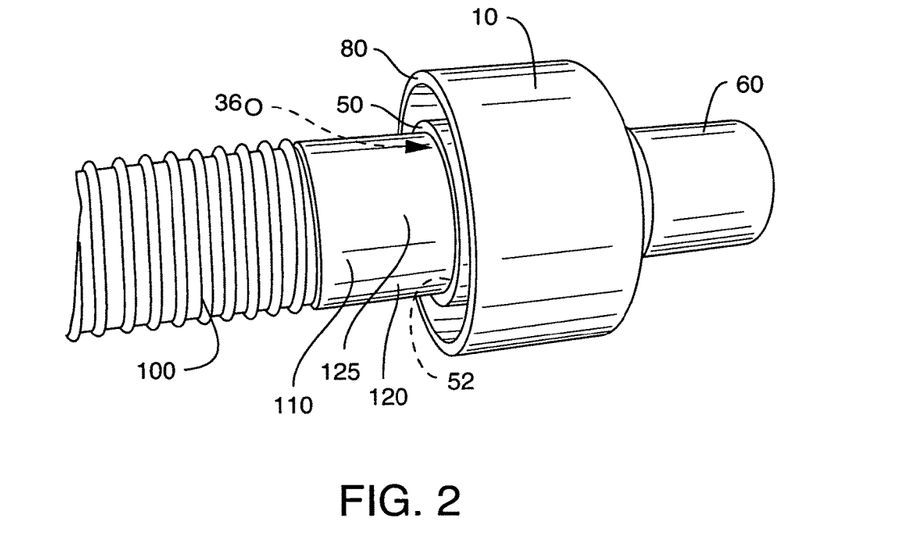
FIG. 2 is a side perspective view in which a first sleeve defined by the adaptor of FIG. 1 defines a female coupling member into which has been inserted a male coupling member of a first conduit.
Figure 3:
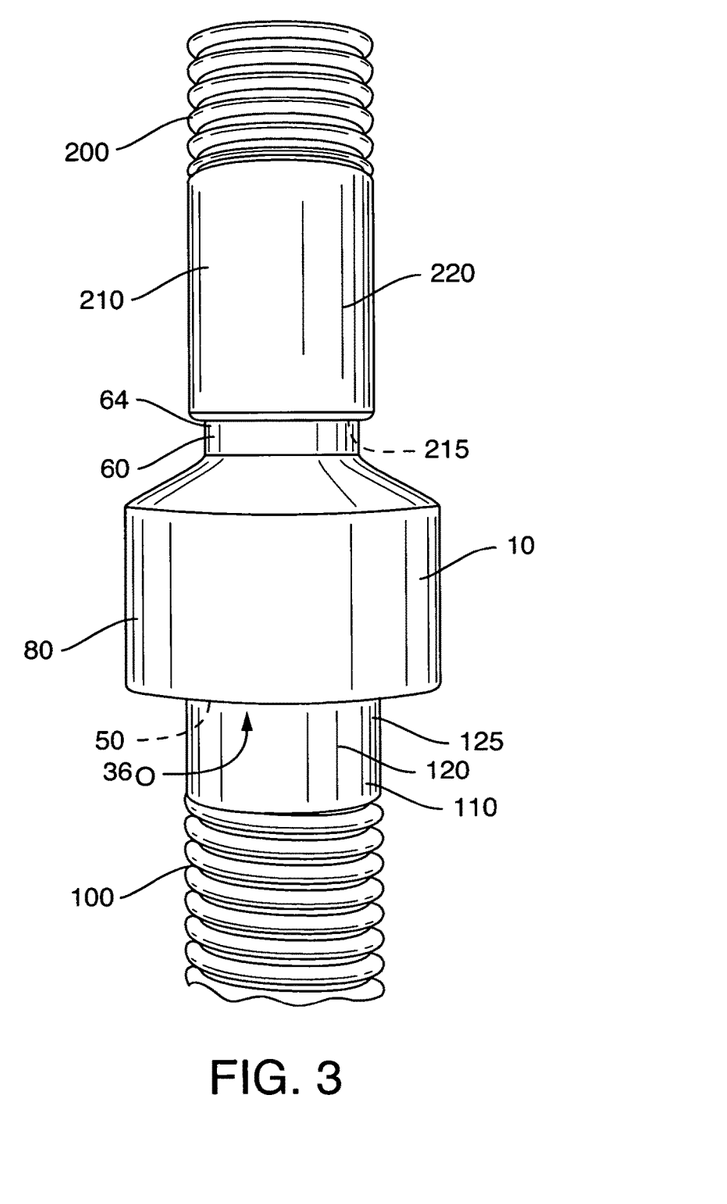
FIG. 3 is a side view in which a second sleeve of the adaptor shown in FIG. 2 defines a male coupling member that has been inserted into a female coupling member of a second conduit.

Despite the lack of taper in the first-sleeve inner surface 52 in the example of FIGS. 1 and 1A, the first sleeve 50 can nonetheless serve as a female coupling member (i.e., connector) relative to a first conduit 100 having a first-conduit first end 110 tapered so as to define a male connector. Such a coupling combination is shown in FIG. 2. More specifically, in FIG. 2, the tapered first-conduit first end 110 of a first conduit 100 defines a male coupling member 120 that has been inserted (axially along the central-conduit axis $A_{cc}$) into the first opening 36o of the first sleeve 50 defined by the central-conduit first end 36. The materials from which the first-conduit first end 110 and the first sleeve 50 of the conduit-coupling adaptor 10 are fabricated, as well as the respective dimensions of the first-conduit first end 110 and the first sleeve 50, are predetermined such that the first conduit 100 and the conduit-coupling adaptor 10 are coupled through frictional engagement between a male-coupling outer surface 125 and the first-sleeve inner surface 52.

Returning to FIG. 1A, the second sleeve 60 has second-sleeve inner and outer diameters $D_{iS2}$ and $D_{oS2}$. As with the first-sleeve inner and outer diameters $D_{iS1}$ and $D_{oS1}$, either or both of the second-sleeve inner and outer diameters $D_{iS2}$ and $D_{oS1}$ can vary as a function of axial displacement along the central-conduit axis Acc, which can similarly define whether the second sleeve 60 serves as a male or female connector, or both. In the particular example of FIG. 1A, the second-sleeve outer diameter $D_{oS2}$ reduces as a function of displacement along the central-conduit axis $A_{cc}$ in a direction away from the conduit center portion 37. That is, like the first-sleeve outer surface 54, the second-sleeve outer surface 64 tapers toward a distant focal point (not shown), but in this case the focal point would be located beyond the top edge of the drawing sheet. The tapering of the second-sleeve outer surface 64 in this manner facilitates the use of the second sleeve 60 as a male connector, as shown, for example, in FIG. 3, in which the second sleeve 60 is coupled to a second conduit 200. More specifically, in FIG. 3, a second conduit 200 has a second-conduit first end 210 with a female-coupling inner surface 215 defining a female coupling member 220. The second sleeve 60 is shown received (by axial insertion) within the female coupling member 220 such that the second-sleeve outer surface 64 frictionally engages the female-coupling inner surface 215. As with the example of the first sleeve 50 described with reference to FIG. 2, the materials from which the second sleeve 60 and female coupling member 220 are fabricated cooperatively define a sufficiently high coefficient of friction for the second sleeve 60 to be retained by friction within the female coupling connector 220 under normal use.

Figure 4:
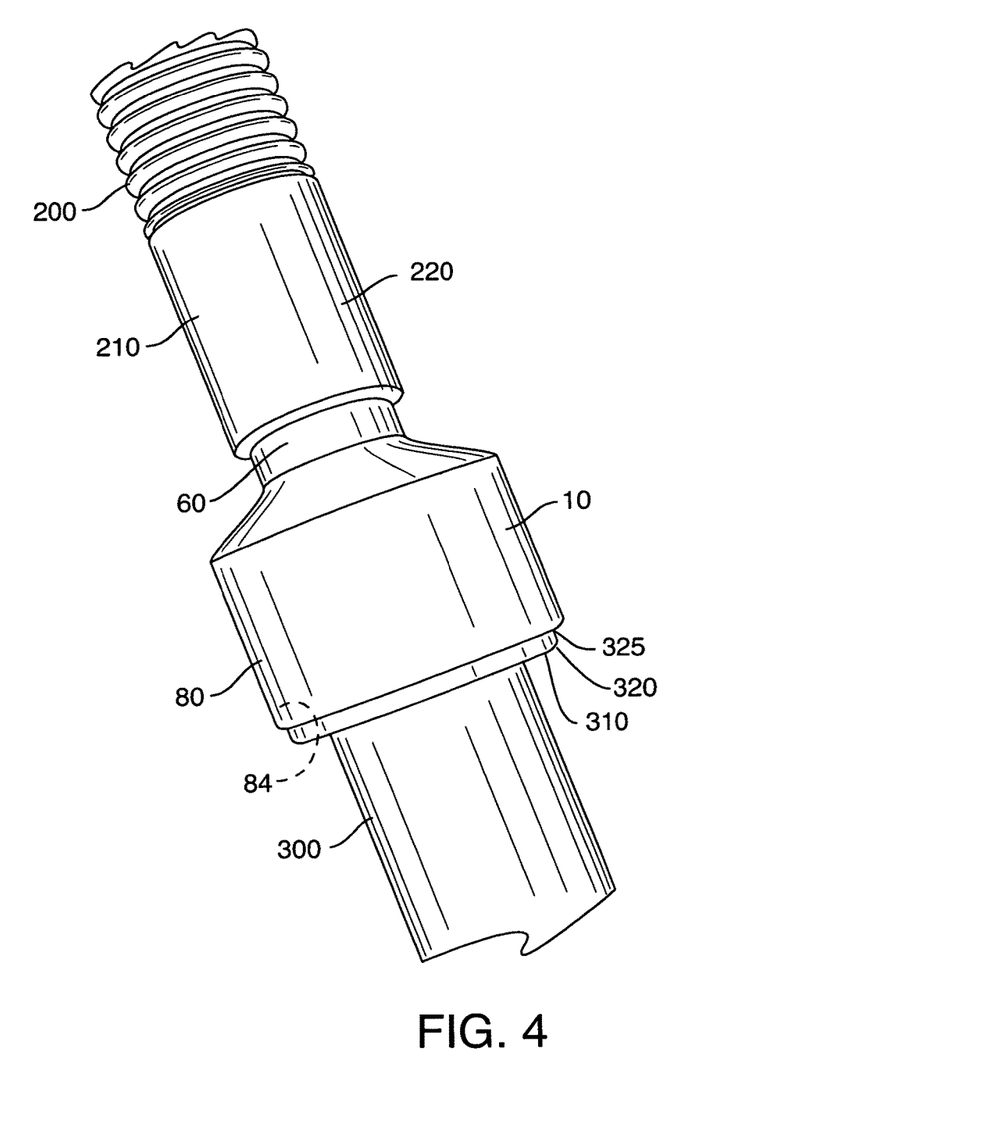
FIG. 4 is a side view of an illustrative conduit-coupling adaptor like that of FIGS. 1-3 in which a skirt co-axially disposed about the first sleeve (visible in FIGS. 1, 1A and 2) defines a female coupling member into which has been inserted a male coupling member defined at an end of a third conduit.

Referring now to FIGS. 1A and 4, the inside surface 84 of the skirt wall 82 (alternatively, "skirt-wall inside surface 84") defines a "socket" that is configured for use as a female connector (alternatively, "female coupling member"). More specifically, the skirt-wall inside surface 84 defines a skirt-wall inside diameter $D_{iSW}$ that is larger than the first-sleeve outer diameter $D_{oS1}$ and, thereby, defines a socket that is configured for insertably receiving a male coupling member of another conduit. In FIG. 4, a third conduit 300 has a third-conduit first end 310 configured as a male coupling member 320 insertably received into the skirt 80. In the particular example of FIG. 4, the third conduit 300 happens to be an adaptor itself, but it will be appreciated that the third conduit 300 could be a vacuum system hose as in the cases of the illustrative first and second conduits 100 and 200. As with the previous examples, the selectively separable coupling between the third conduit 300 and the shirt 80 is maintained by friction. More specifically, the inside surface 84 of the skirt wall 82 frictionally engages a male-coupling outer surface 325 of the male coupling member 320.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact constructions, implementations and versions shown and described.

What is claimed is:

1. A conduit-coupling adaptor configured for mutually coupling through frictional engagement fluid conduits of disparate diameters, the adaptor comprising:
    a self-supporting central conduit having a central-conduit wall with interior and exterior surfaces extending longitudinally along a central-conduit axis between central-conduit first and second ends integrally joined to one another through a conduit center portion situated between the first and second ends;
    a first-end coupling sleeve defined by the central-conduit first end and extending longitudinally away from the conduit center portion toward a first opening defined by the central-conduit first end, the first-end coupling sleeve having first-sleeve inner and outer surfaces defined by, respectively, coextensive portions of the interior and exterior surfaces of the central-conduit wall;
    a second-end coupling sleeve defined by the central-conduit second end and extending longitudinally away from the conduit center portion, in a direction opposite the extension of the first-end coupling sleeve, toward a second opening defined by the central-conduit second end, the second-end coupling sleeve having second-sleeve inner and outer surfaces defined by, respectively, coextensive portions of the interior and exterior surfaces of the central-conduit wall, the second-end coupling sleeve outer surface having a diameter that varies gradually as a function of displacement along the central conduit axis; and
    a self-supporting first-end skirt concentrically disposed about at least a lengthwise portion of the central-conduit first end, the skirt being (i) defined by a skirt wall having skirt-wall inside and outside surfaces that longitudinally coextend with at least a portion of the first-end coupling sleeve and (ii) joined to the central conduit by a shoulder that transitions the skirt-wall inside and outside surfaces to the exterior surface of the central conduit wall, wherein
    (a) the first-end coupling sleeve has first-sleeve inner and outer diameters and the second-end coupling sleeve has second-sleeve inner and outer diameters;
    (b) the first-sleeve inner diameter does not reduce as a function of displacement along the central-conduit axis in a direction away from the conduit center portion;
    (c) at least one of the first-sleeve outer diameter, the second-sleeve inner diameter and the second-sleeve outer diameter varies as a function of axial displacement along the central-conduit axis; and
    (d) the conduit coupling adaptor is integrally molded as a single piece.

2. The conduit-coupling adaptor of claim 1 wherein at least one of the first-sleeve outer diameter and the second-sleeve outer diameter reduces as a function of displacement along the central-conduit axis in a direction away from the conduit center portion in order to facilitate the implementation of, respectively, the first-end coupling sleeve and the second-end coupling sleeve as a male coupling member for insertion into, and retention by frictional engagement with, a female coupling member of another conduit.

3. The conduit-coupling adaptor of claim 2 wherein the skirt-wall inside surface defines a skirt-wall inside diameter larger than the first-sleeve outer diameter and defines a socket that is configured as a female connector for insertably receiving and retaining by frictional engagement a male coupling member of another conduit.

4. The conduit-coupling adaptor of claim 1 wherein the skirt-wall inside surface defines a skirt-wall inside diameter larger than the first-sleeve outer diameter and defines a socket that is configured as a female connector for insertably receiving and retaining by frictional engagement a male coupling member of another conduit.

5. The conduit-coupling adaptor of claim 4 wherein, in addition to being self-supporting, the adaptor (i) has a predefined default configuration from which it can be flexed when subjected to an applied distorting force and (ii) exhibits a restorative memory property such that, when the distorting force is removed, the adaptor returns to its predefined configuration.

6. The conduit-coupling adaptor of claim 5 fabricated from at least one of rubber and a polymeric material.

7. The conduit-coupling adaptor of claim 3 wherein, in addition to being self-supporting, the adaptor (i) has a predefined default configuration from which it can be flexed when subjected to an applied distorting force and (ii) exhibits a restorative memory property such that, when the distorting force is removed, the adaptor returns to its predefined configuration.

8. The conduit-coupling adaptor of claim 1 wherein, in addition to being self-supporting, the adaptor (i) has a predefined default configuration from which it can be flexed when subjected to an applied distorting force and (ii) exhibits a restorative memory property such that, when the distorting force is removed, the adaptor returns to its predefined configuration.

9. A conduit-coupling adaptor for mutually coupling through frictional engagement fluid conduits of disparate diameters, the adaptor having a predefined default configuration and comprising:
    a self-supporting central conduit having a central-conduit wall with interior and exterior surfaces extending longitudinally along a central-conduit axis between central-conduit first and second ends integrally joined to one another through a conduit center portion situated between the central-conduit first and second ends;

a first-end coupling sleeve defined by the central-conduit first end and extending longitudinally away from the conduit center portion toward a first opening defined by the central-conduit first end, the first-end coupling sleeve having first-sleeve inner and outer surfaces defined by, respectively, coextensive portions of the interior and exterior surfaces of the central-conduit wall;

a second-end coupling sleeve defined by the central-conduit second end and extending longitudinally away from the conduit center portion, in a direction opposite the extension of the first-end coupling sleeve, toward a second opening defined by the central-conduit second end, the second-end coupling sleeve having second-sleeve inner and outer surfaces defined by, respectively, coextensive portions of the interior and exterior surfaces of the central-conduit wall, the second-end coupling sleeve outer surface having a diameter that varies gradually as a function of displacement along the central conduit axis; and a self-supporting first-end skirt concentrically disposed about at least a lengthwise portion of the central-conduit first end, the skirt being (i) defined by a skirt wall having skirt-wall inside and outside surfaces that longitudinally coextend with at least a portion of the first-end coupling sleeve and (ii) joined to the central conduit by a shoulder that transitions the skirt-wall inside and outside surfaces to the exterior surface of the central conduit wall, wherein (a) the adaptor is fabricated from a material exhibiting a restorative memory property such that, when subjected to a distorting force, the adaptor can be flexed from the default configuration and, when the distorting force is removed, the adaptor returns to its default configuration;

(b) the first-end coupling sleeve has first-sleeve inner and outer diameters and the second-end coupling sleeve has second-sleeve inner and outer diameters;

(c) the skirt-wall inside surface defines a skirt-wall inside diameter larger than the first-sleeve outer diameter, and defines a socket that is configured as a female connector for insertably receiving and retaining by frictional engagement a male coupling member of another conduit, (d) in the default configuration, the first-sleeve inner diameter does not reduce as a function of displacement along the central-conduit axis in a direction away from the conduit center portion;

(e) in the default configuration, at least one of the first-sleeve outer diameter and the second-sleeve outer diameter reduces as a function of displacement along the central-conduit axis in a direction away from the conduit center portion in order to facilitate the implementation of, respectively, the first-end coupling sleeve and the second-end coupling sleeve as a male coupling member; and (f) the conduit coupling adaptor is integrally molded as a single piece.

10. The conduit-coupling adaptor of claim 9 wherein both the first-sleeve outer diameter and the second-sleeve outer diameter reduce as a function of displacement along the central-conduit axis in a direction away from the conduit center portion in order to facilitate the implementation of, respectively, the first-end coupling sleeve and the second-end coupling sleeve as a male coupling member.

11. The conduit-coupling adaptor of claim 10 wherein, in the default configuration, the first-sleeve inner diameter is configured not to vary as a function of axial displacement along the central-conduit axis.

12. The conduit-coupling adaptor of claim 10 wherein, in the default configuration, the first-sleeve inner diameter increases as a function of axial displacement along the central-conduit axis in a direction away from the conduit center portion in order to facilitate the implementation of the first-end coupling sleeve as a female coupling member.

\* \* \* \* \*